United States Patent Office 3,556,821
Patented Jan. 19, 1971

3,556,821
PORCELAIN ENAMEL FOR HOT WATER TANKS
Alvin S. Hanzlik, Downers Grove, Otto C. Linhart, Cicero, and Marvin D. Putze, Roselle, Ill., assignors to Eagle-Picher Industries, Inc., Cincinnati, Ohio, a corporation of Ohio
No Drawing. Filed Nov. 18, 1968, Ser. No. 776,756
Int. Cl. C03c 5/02
U.S. Cl. 106—48                         6 Claims

ABSTRACT OF THE DISCLOSURE

Porcelain enamel composition particularly suited for use in lining hot water tanks, the composition containing controlled amounts of silicon dioxide, titanium dioxide, boric oxide, sodium oxide, lithium oxide, calcium oxide, cobalt oxide, manganese oxide, fluorine, and optionally zirconia, potassium oxide and nickel oxide, the percentages of the boric oxide, manganese oxide, fluorine, zirconia, and manganese oxide being controlled to produce an enamel coating which has excellent chemical durability, adherence and freedom from defects.

BACKGROUND OF THE INVENTION

Field of the invention

This invention is in the field of hot water tanks and more specifically, in the field of porcelain enamel compositions which are applied as a single coat to sheet steel to prevent rusting of the base metal by the hot water.

Description of the prior art

Hot water heating tanks are conventionally applied with linings of porcelain enamel to prevent attack of the sheet steel casing by the many and varied corrosion promoting agents present in the water. In providing such porcelain enamel compositions, there has always been the necessity to compromise between the various properties such as chemical durability, adherence and workability. The problem is particularly acute in hot water heaters because for reasons of economy, only a single coat of relatively small thickness is conventionally applied. Some enamels used in the past have exhibited good chemical durability, but their adherence and lack of workability have been severe drawbacks. Workability is particulraly important in enamels of this type because an enamel coating which does not have good workability is very likely to evidence pinholes and copperheads, these conditions presumably being due to gas evolution during firing of the enamel onto the substrate.

SUMMARY OF THE INVENTION

The present invention provides an improved one coat, porcelain enamel frit composition which evidences excellent chemical durability and adherence while at the same time having good workability properties so that a relatively thin enamel lining on the order of 5 to 6 mils in thickness can be provided without evidence of pinhole or copperheading defects. At a thickness of one to two mils, the enamel coating of the present invention is also characterized by a rather unique surface appearance, having a leather-like texture which may be due to its ability to take up iron oxide from the surface of the sheet steel.

The improved porcelain enamel frit of the present application contains a major proportion of silica, together with controlled amounts of titania, boric oxide, sodium oxide, lithium oxide, calcium oxide, cobalt oxide, manganese oxide, and fluorine. In the preferred embodiment, the frit also contains small controlled amounts of zirconia, potassium oxide, and nickel oxide. While all of these compounds have previously been employed in porcelain enamel frits for lining hot water tanks, the frit of the present invention contains a balance between the various oxides in the composition which has been found to be responsible for the substantially improved workability properties which characterize the enamel coatings produced from the frits of the present invention.

DESCRIPTION OF THE PREFERRED EMBODIMENTS

The improved frits of the present invention have the following overall composition:

Table I

|  | Percent by weight |
|---|---|
| $SiO_2$ | 45.4 to 55.4 |
| $TiO_2$ | 1.5 to 6.5 |
| $ZrO_2$ | 0 to 6.0 |
| $B_2O_3$ | 7.0 to 14.0 |
| $Na_2O$ | 7.9 to 16.9 |
| $K_2O$ | 0 to 3.0 |
| $Li_2O$ | 1.6 to 5.6 |
| $CaO$ | 1.3 to 6.3 |
| $CoO$ | 0.7 to 3.7 |
| $MnO$ | 1.5 to 6.5 |
| $NiO$ | 0 to 2.2 |
| $F_2$ | 2.0 to 10.0 |

In order to achieve the improvements of the present invention to the highest degree, the various components should be adjusted such that the factor:

$$\frac{B_2O_3 + MnO}{F_2}$$

where the concentrations are expressed in weight percentages, is at least 1.2 and the factor:

$$\frac{F_2 + ZrO_2}{MnO}$$

is no more than 5.3. It is also important for the best results that the sum of the $SiO_2$ and $ZrO_2$ contents be in the range from 50 to 60% by weight and that the following equation be satisfied:

$$K_2O + 1.65\ Na_2O + 2.6\ Li_2O = 26.5 \text{ to } 37.0$$

Within the broader analysis specified above, the following table sets forth a particularly preferred composition:

Table II

|  | Percent by weight |
|---|---|
| $SiO_2$ | 47 to 52 |
| $TiO_2$ | 3 to 5 |
| $ZrO_2$ | 1 to 4 |
| $B_2O_3$ | 8 to 12 |
| $Na_2O$ | 9 to 15 |
| $K_2O$ | 1 to 2 |
| $Li_2O$ | 2 to 5 |
| $CaO$ | 2 to 5 |
| $CoO$ | 1 to 3 |
| $MnO$ | 2 to 6 |
| $NiO$ | 0.5 to 2 |
| $F_2$ | 3 to 9 | with the same relationships holding as previously expressed between the oxides and fluorine.

The frit compositions of the present invention are applied by the conventional wet process technique, utilizing about 15 to 35 parts by weight of a mill addition to 100 parts by weight of the frit. The firing temperatures of the frits range from about 1520 to 1620° F.

It has been found that at light weight of application, the texture of the enamel provides a reliable and simple test as to whether or not the frit produces a surface substantially free from pinholes, copperheads or other defects. This test was found to be a more reliable indicator of workability than the usual examination of test plates which are subject to many random errors, and therefore inconclusive results.

The test which we developed consists in spraying one side of a 4 inch by 4 inch hot rolled steel of 14 gauge thickness so that a dry deposit of 15 grams per square foot appears. The test plate is then placed on a ¼ inch thick iron plate fired at 1580° F. for 24 minutes to simulate a hot water tank production firing. The presence of a characteristic leathery texture in the enamel provides a very reliable indication that the frit upon application to the sheet steel of a hot water tank will be free from pinholes, copperheads, and other defects. It appears that the unusual leathery texture of the enamel may be due to the ability of the enamel to absorb iron oxide from the surface of the sheet steel into solid solution, producing a tenacious bond at the interface with steel.

The following specific example is included to illustrate how the compositions of the present invention are prepared and used, but should be taken as purely illustrative of the invention.

EXAMPLE

A mixture was made up of the following raw batch materials:

Table III

| | Percent by weight |
|---|---|
| Silica | 39.3 |
| Anhydrous sodium carbonate | 5.8 |
| Sodium nitrate | 1.0 |
| Calcium carbonate | 6.1 |
| Potassium carbonate | 2.0 |
| Sodium silicofluoride | 8.8 |
| Titanium dioxide | 3.5 |
| Zircon | 4.0 |
| Lithium carbonate | 7.8 |
| Razorite | 13.8 |
| Cobalt oxide | 2.1 |
| Manganese dioxide | 4.8 |
| Nickel oxide | 1.0 |

The composition was smelted and milled to provide a particle size such that no more than about 2 or 3% was retained on a 200 mesh screen, the frit having the following analysis:

Table IV

| | Percent by weight |
|---|---|
| $SiO_2$ | 50.4 |
| $TiO_2$ | 4.0 |
| $ZrO_2$ | 3.0 |
| $B_2O_3$ | 10.5 |
| $Na_2O$ | 12.4 |
| $K_2O$ | 1.5 |
| $Li_2O$ | 3.6 |
| $CaO$ | 3.8 |
| $CoO$ | 2.2 |
| $MnO$ | 4.0 |
| $NiO$ | 1.1 |
| $F_2$ | 6.0 |
| | 102.5 |
| Minus oxygen for fluorine | 2.5 |
| | 100.0 |

One hundred parts by weight of the frit composition were combined with a conventional mill addition having the following composition:

Table V

| | Parts |
|---|---|
| Silica | 20 |
| Clay | 8 |
| Bentonite | ½ |
| Borax | ¾ |
| Magnesium carbonate | ¼ |
| Potassium nitrite | ½ |
| Sodium pyrophosphate | 1/64 |

The mixture of frit and mill addition was applied by conventional wet process techniques to steel plates and fired on at 1580° F. The firing resulted in the production of a leathery type finish.

The porcelain enamels produced according to the present invention were evaluated for resistance to attack by hot aqueous chemical solutions and for resistance to attack by softened water at elevated temperatures and relatively low pressures.

The first test involved providing test plates measuring 2⅞ inches by 3¼ inches composed of 18 gauge enameling iron. The edges were rounded with a file to insure complete enamel coverage. One hole 3/16 inch in diameter was punched in one corner of the plates.

The porcelain enamel to be tested was applied by dipping or spraying at 30 grams per square foot dry on each side. Care was exercised to keep edge beads to a minimum. The test plates were then fired at the optimum firing temperature for the enamel, in a hanging position.

The enameled plates were carefully washed with detergent in warm water and scrubbed with a clean cloth to remove all grease and soil. They were then wiped with a lint-free towel and dried at 210 to 220° F. for one hour and allowed to cool to room temperature in a dessicator before weighing. The sample plates were taken from the dessicator and carefully weighed. The weighed plate was then placed in a fixture including an open ended pyrex bottle spaced from the plate by a rubber sealing gasket, the opposite end of the bottle having a reflux condenser connected thereto. One hundred cubic centimeters of the test solution were employed in each test cylinder. The test fixtures were placed on an electric hotplate and the test solution was heated rapidly. The start of boiling in the cylinders was taken as zero time. The current input to the hotplate was then adjusted downward to the point where the solutions remained as a gentle rolling boil. After the test, the fixtures were removed from the hotplate and the test plates were rinsed and sprinkled with a mild porcelain enamel cleanser powder. The tested surfaces were then wet scrubbed with a stiff nylon bristle brush to remove gasket marks and loose material on the surface of the plates. The plates were then thoroughly rinsed, inspected, dried and weighed as before. The results obtained with the enamels of the present invention, with various test solutions, are reported in the following table.

TABLE VI

| Test solution | Duration, hours | Weight loss, mg./sq. in. |
|---|---|---|
| 10% HCl | 5½ | 1.0 |
| 10% NaOH | 5½ | 6.9 |

In the second series of tests, curved plates measuring 2½ inches by 2½ inches were clamped with gaskets onto the side wall of a stainless steel tank so that a 1⅝ inch circular area of enamel was exposed to hot water in the tank. Prior to and after each test cycle, the specimens were scrubbed with a detergent-abrasive cleaner using a nylon brush, rinsed in tap water, dried at 275° F. for 20 to 30 minutes, cooled in a dessicator, and weighed. With the specimens in place, the tank was operated at 200° F. and the timer was set to change ⅓ of the water in the tank (34 gallons) every three hours in 2¼ minutes. After two weeks, the weight loss in milligrams per square inch was determined, and the test repeated for a total of ten weeks. Under these conditions, the enamels of the present invention evidenced a weight loss of only 37.0 milligrams per square inch.

It should be evident that various modifications can be made to the described embodiments without departing from the scope of the present invention.

We claim as our invention:

1. An improved porcelain enamel frit for application to sheet steel in the manufacture of hot water tanks consisting essentially of the following composition:

| | Percent by weight |
|---|---|
| $SiO_2$ | 45.4 to 55.4 |
| $TiO_2$ | 1.5 to 6.5 |
| $ZrO_2$ | 0 to 6.0 |
| $B_2O_3$ | 7.0 to 14.0 |
| $Na_2O$ | 7.9 to 16.9 |
| $K_2O$ | 0 to 3.0 |
| $Li_2O$ | 1.6 to 5.6 |
| CaO | 1.3 to 6.3 |
| CoO | 0.7 to 3.7 |
| MnO | 1.5 to 6.5 |
| NiO | 0 to 2.2 |
| $F_2$ | 2.0 to 10.0 | wherein the weight percentages in said composition are such that the factor:

$$\frac{B_2O_3 + MnO}{F_2}$$

is at least 1.2 and the factor:

$$\frac{F_2 + ZrO_2}{MnO}$$

is no more than 5.3.

2. The frit composition of claim 1 in which the sum of the $SiO_2$ and $ZrO_2$ contents is in the range from 50 to 60% by weight.

3. The frit composition of claim 1 in which the weight percentages are such that the following equation is satisfied:

$K_2O + 1.65\ Na_2O + 2.6\ Li_2O = 26.5$ to 37.0

4. An improved porcelain enamel frit for application to sheet steel in the manufacture of hot water tanks consisting essentially of the following composition:

| | Percent by weight |
|---|---|
| $SiO_2$ | 47 to 52 |
| $TiO_2$ | 3 to 5 |
| $ZrO_2$ | 1 to 4 |
| $B_2O_3$ | 8 to 12 |
| $Na_2O$ | 9 to 15 |
| $K_2O$ | 1 to 2 |
| $Li_2O$ | 2 to 5 |
| CaO | 2 to 5 |
| CoO | 1 to 3 |
| MnO | 2 to 6 |
| NiO | 0.5 to 2 |
| $F_2$ | 3 to 9 | wherein the weight percentages in said composition are such that the factor:

$$\frac{B_2O_3 + MnO}{F_2}$$

is at least 1.2 and the factor $$\frac{F_2 + ZrO_2}{MnO}$$

is no more than 5.3.

5. The frit composition of claim 4 in which the sum of the $SiO_2$ and $ZrO_2$ contents is in the range from 50 to 60% by weight.

6. The frit composition of claim 4 in which the weight percentages are such that the following equation is satisfied:

$K_2O + 1.65\ Na_2O + 2.6\ Li_2O = 26.5$ to 37.0

References Cited

UNITED STATES PATENTS

| 3,017,279 | 1/1962 | Van Dolah et al. | 106—48 |
| 3,095,311 | 6/1963 | Von Wranau | 106—54 |
| 3,098,753 | 7/1963 | Van Dolah et al. | 106—48 |
| 3,285,773 | 11/1966 | Dunning | 106—48 |

TOBIAS E. LEVOW, Primary Examiner

R. D. EDMONDS, Assistant Examiner

U.S. Cl. X.R.

106—54